United States Patent

[11] 3,614,329

[72] Inventors Herbert Topfer;
Winfried Werr, both of Munich, Germany

[21] Appl. No. 6,046
[22] Filed Jan. 26, 1970
[45] Patented Oct. 19, 1971
[73] Assignee Siemens Aktiengesellschaft
Munich, Germany
[32] Priority Sept. 23, 1965
[33] Germany
[31] S99,614
Continuation of application Ser. No. 579,735, Sept. 15, 1966.

[54] TELEPHONE EXCHANGE INSTALLATION HAVING AUXILIARY SERVICES
7 Claims, 2 Drawing Figs.

[52] U.S. Cl. .......... 179/18 BE
[51] Int. Cl. .......... H04m 3/42
[50] Field of Search .......... 179/18.03, 27.11, 27.25, 27 CA, 27 CI, 16.45, 17.1, 2 DP, 27.02, 5.5, 18.19

[56] References Cited
UNITED STATES PATENTS
2,957,047 10/1960 Wennemer .......... 179/18 (.03)

*Primary Examiner*—Ralph D. Blakeslee
*Attorney*—Birch, Swindler, McKie & Beckett ABSTRACT: In long distance communication installations in which dial signals are emitted by ;the subscriber stations for establishment of connections, and thereafter information signals are emitted for use in connection with auxiliary functions, central exchange systems are provided with means for transforming the information contents of the information signals to conform with differences in auxiliary function capabilities from exchange to exchange, and from station to station.

TELEPHONE EXCHANGE INSTALLATION HAVING AUXILIARY SERVICES

CROSS REFERENCE TO RELATED APPLICATION

This application is a continuation of application No. 579,735, filed Sept. 15, 1966, now abandoned.

Applicants claim priority from corresponding German application, Ser. No. S99,614, filed Sept. 23, 1965.

SUMMARY OF THE INVENTION

This invention relates to a telephone exchange installation providing for auxiliary services demandable by the transmission of information signals subsequently to the transmission of dial signals for establishing a desired connection between calling and called subscriber stations and, more particularly, to such an installation wherein transformation of the information signals may be effected in central control systems in accordance with circuit characteristics and capabilities of the calling and the called subscriber stations and the exchanges associated therewith.

In accordance with known practice, auxiliary services typically are demanded by information signals transmitted by a calling subscriber subsequently to the transmission of dial signals which identify and suffice to complete the call connection to a desired, called subscriber station. As discussed more fully hereafter, different exchanges may provide different types of auxiliary services which are not compatible with one another or, in some cases, no auxiliary services at all. In accordance with the invention, this incompatibility is obviated through the provision of central systems associated with the different exchanges in which the information content of the information signals received from a calling subscriber station and to be transmitted to a called subscriber station may be converted or transformed in accordance with the circuit conditions and capabilities of the calling and called subscribers, including the identification of the special auxiliary services authorized by the information signals produced by the calling subscriber and/or the available or assigned services provided at the called subscriber station.

As one example of such special or auxiliary services, a called subscriber station may be provided with announcement apparatus for responding to information signals to identify the calling subscriber, prior to the called subscriber's responding to the call. As an alternative, apparatus may be provided to register information identifying the calling subscriber, where the called subscriber either chooses not to, or is not available to respond to the connection request from the calling subscriber. In such a system, the called subscriber station may include apparatus on which the calling subscriber's name is visually presented, prior to the called subscriber responding to the call. Further, where the called subscriber is absent or does not wish to respond to the call, the called subscriber station may reroute the incoming call to a central register which registers the calling number of each calling subscriber. As a further auxiliary service, the central control system may include information registration means whereby it may transform the information content of information signals emitted by, and identifying the calling subscriber by his calling number, and derive from the calling number the name of the calling subscriber.

Transformation or, in some cases, suppression of the information presented by the information signals received from a calling subscriber is necessary if the called subscriber station is not equipped with apparatus for responding to the information signals. For example, if the called subscriber station has apparatus capable only of indicating the location of a calling subscriber, the central control system may transform the information signals, which may contain the calling number of the calling subscriber in addition to other information, and derive therefrom information signals which indicate the location of the calling subscriber. Thus, the apparatus at the called subscriber station will be utilized to present at least this information to the called subscriber. In the alternative, if the called subscriber station includes no apparatus for presenting auxiliary information in response to the transmitted information signals, in addition to the situation in which the apparatus at the called station is capable of responding to only a portion of the transmitted information signals. A suitable indication signal may be transmitted to the calling subscriber to inform him of this circumstance.

A further situation in which information transformation is to be effected occurs in the transmission of experimental digits. In accordance with the invention, the central control systems effect the experimental digit transformation in response to the dialing of the called subscriber stations and without requiring the provision of special apparatus at the called subscriber stations.

In accordance with a further embodiment of the invention, information signals may be transformed to produce dial signals. It is apparent that upon the receipt of information signals, suitable response and/or registration means must be provided if the information content thereof is to be retained. For example, the information signals may effect switching operations on switching systems in the central control system or in other associated apparatus of an exchange office, or in the called subscriber station. Preferably, these switching operations are effected automatically. As a result, there automatically is provided the required transformation of information signals received from a calling subscriber into appropriate signals which are transmitted to the called subscriber station. These signals comprise new information signals having the same or different information content as the originally received information signals, or dial signals, to which the apparatus associated with the called subscriber station is capable of responding.

The provision of code conversion systems in telephone exchange installations is a well-known and highly developed technique. Code conversion systems may be readily incorporated with the information transformation systems provided by the central control systems of the invention. As a result, central control systems for fulfilling both information transformation and code conversion automatically and simultaneously, may be provided in accordance with the invention at a relatively low cost.

The system of the invention therefore provides compatibility between auxiliary services which may be demanded by information signals transmitted between calling and called subscribers of the same or different exchanges, assuming maximum utilization of these auxiliary services and therefore maximum utilization and efficiency in the operation of telephone installations providing these auxiliary services.

STATE OF THE PRIOR ART

Prior art systems provide for the establishment of auxiliary services in completed call connections. The auxiliary services are understood to be connection capabilites for the transmission and reproduction in understandable form of information through means other than customary, or conventional speaking or oral communication paths. Such systems provide for the auxiliary services both in conventional local and long distance call connections, and in other call connections, such as reconfirmation connections.

An example of an auxiliary service which is provided by prior art systems is known as "wake-up" services. To request the wake-up service, a calling subscriber demands, through the emission of dial signals, a call connection between his corresponding subscriber station and a central wake-up station. When the demand connection is established, the subscriber then transmits to the central wake-up station the appropriate information for identifying his subscriber station, such as its calling number, and other appropriate information, such as the time at which the subscriber wishes to be awakened. The awakening, of course, may comprise merely the ringing of the receiver at the subcriber station at the appropriate time under the control of the central wake-up station. The transmission of the appropriate information is typically effected by dialing a series of digits in accordance with a preestablished code. These digits are transmitted by the subscriber station as a series of pulses which may generally be referred to as information signals. The information signals transmitted in the established call connection therefore replace the conventional speaking or communication paths typically provided in a completed call connection in a telephone installation.

Another example of auxiliary services is known as experimental digit value transmission. In this type of operation, after a demand call connection is established, but prior to the transmission of the experimental digit values, information signals are exchanged between the calling and called subscriber stations which serve to ascertain whether the correct stations are properly connected. The correct stations, in this operation, may comprise the calling subscriber station and a called experimental digit value emitter. After confirmation of the correct circuit connections, the transmission of experimental digital values between the calling and the called subscriber stations, the latter being, in this case, the experimental value emitter, may take place. An additional capability in this type of operation comprises initially establishing a call connection between two conventional subscriber stations. Thereafter, additional signals may be transmitted to establish call connections between the two subscriber stations and an experimental digit value station, including both experimental digit value emitters and receivers. The installation providing this service may then provide additionally for commutations between the subscriber stations and the experimental digit value emitters and receivers for effecting desired signal transmissions therebetween.

Prior art systems also provide for special services in established call connections between conventional calling and called subscriber stations which may be demanded by the transmission of information signals by the calling subscriber station. For example, a calling subscriber may introduce himself to the called subscriber, prior to the establishment of a speaking path connection, by controlling suitable announcement means at the called subscriber station. The controlling or setting of said announcement means is effected through the transmission by the subscriber of appropriate information signals to the called subscriber station. The announcement means may comprise any of various electromechanical or electrical apparatus, such as meters, audio systems, or an electronic display device such as a light matrix system, which may be controlled by the information signals to present the desired information. The information may comprise the calling number of the calling subscriber or even the name of the calling subscriber. The desirability of such a special service is apparent. Very briefly, as one example, the announcement system permits the called subscriber, even though engaged in a prior call connection, or prior to his responding to the call, and thus while his corresponding called subscriber station is still in calling condition, to determine the identity of the calling subscriber.

The provision of such special services is particularly difficult in long distance communication installations. The geographic extent of such long distance installations may encompass world-wide communication networks. Ideally, limitations on such special services should not be limited geographically. However, such world-wide long distance communications necessarily require that call connections be established between calling and called subscriber stations associated with remote exchange offices which may be of widely diverse characteristics. Further, individual subscriber stations, even within a single exchange, may have widely different capabilities and characteristics, particularly as relates to available auxiliary services.

Where the differences between calling and called subscriber stations relate only to the programming of the dial code emitting and receiving systems, i.e., the difference relates to the significance of the particular signals in a given code but not to the information content thereof, signal conversion is possible to provide compatibility between the remote subscriber stations.

It is apparent, of course, that such code conversion is necessary if a given information signal transmitted by a calling subscriber station would have a different information content in the receiving subscriber station if it were not converted. For example, a signal in a given code at a calling subscriber station, in accordance with the code programming of the associated exchange office, may represent information "1" bit. This same code signal, however, in accordance with the code programming in the exchange office of the called subscriber station, may represent an information "2" bit. The correct transmission of information between these two subscriber stations necessitates a code conversion in this situation. This code conversion may be effected in a well-known manner at a station located at the border or interchange of groups of exchange offices which operate in accordance with different code programming. Obviously, a plurality of such conversions may be required and may be effected in a known manner between two remote subscriber stations encompassing several different exchanges.

Further difficulties also arise when special services are demanded by a calling subscriber of a given exchange office in a call connection to a called subscriber of a different exchange office in addition to differences in code programming between the two exchanges and the response capabilities of each such exchange. These further difficulties may arise even between subscriber stations associated with the same exchange, which subscriber stations necessarily operate on the same code programming.

The different subscriber stations may be adapted for response to only some or, to no auxiliary services, or may be provided with different types of auxiliary services. Different types of auxiliary services should be understood to include different responses to information signals of a given kind, such as where a called subscriber station waives the receipt of information signals for a particular service for a predetermined time period, enabling the called subscriber to bypass the special service if desired.

Telephone exchange installations heretofore available in the prior art have been ineffective in overcoming these obstacles to the efficient and complete utilization of special or auxiliary service capabilities where the operating capabilities and characteristics of calling and called subscriber stations are different. As a result, the expansion of services in long distance telephone communication is severely and undesirably restricted. The restriction is detrimental not only to the convenience of the subscribers but also prevents full utilization of the specialized equipment for performing these services.

OBJECTS OF THE INVENTION

It is therefore an object of this invention to overcome these and other objections and disadvantages which occur with prior art telephone exchange installations in providing compatibility between calling and called subscriber stations in the provision of special and auxiliary services. The system of the invention provides for transformation of the information signals received from a calling subscriber station in accordance with the operating capabilities and requirements of the called subscriber station. Such transformation includes the transformation of the information content, where necessary, to adapt the special services demanded by the calling subscriber to the services actually assigned or available at the called subscriber station, and to inform the calling subscriber of the unavailability of such demanded services. The system of the invention is readily adapted for use with established code conversion systems, whereby it is of relatively low cost while providing for far more efficient and full utilization of system capabilities.

It is therefore an object of this invention to provide for transformations of information signals in accordance with circuit requirements and capabilities of calling and called subscriber stations.

It is a further object of this invention to provide an improved telephone system wherein auxiliary services of calling and called subscribers are rendered compatible for the demand thereof through information signals transmitted by a calling subscriber.

Still a further object of this invention is to provide a telephone system having exchange installations providing for code conversion and transformation of the information content of information signals transmitted by a calling subscriber to demand auxiliary services at a called subscriber station in accordance with the circuit capabilities and characteristics of both the calling and the called subscriber stations.

These and other objects and advantages of this invention will become apparent in the following detailed description of the invention.

DETAILED DESCRIPTION OF THE INVENTION

Figure 1:
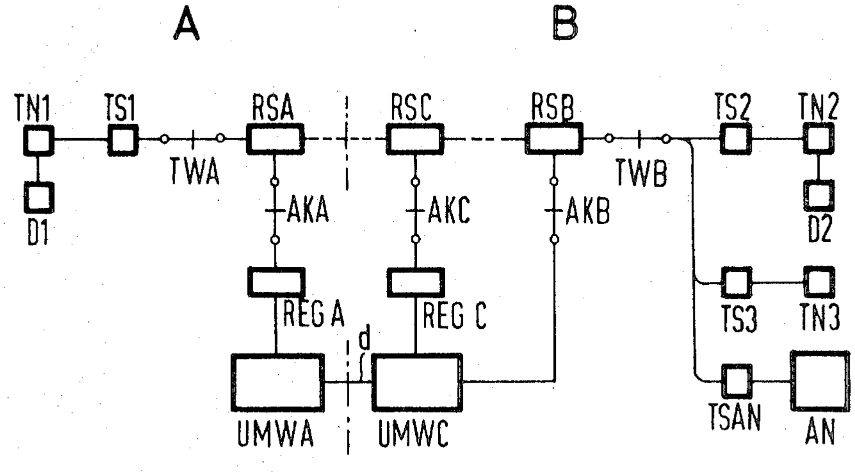
Figure 2:
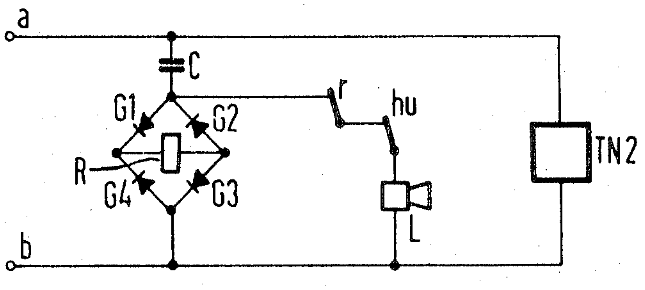

In the drawings:

FIG. 1 shows a block diagram of a telephone installation having central control systems for transforming information signals in accordance with the circuit capabilities and requirements of subscriber stations of remote exchange installations in accordance with the invention, and FIG. 2 shows an example of a subscriber station having auxiliary services operable in response to information signals transmitted by a calling subscriber.

In FIG. 1, there is shown a telephone installation comprising remote exchange offices A and B. A subscriber station TN1 is connected through its corresponding subscriber line and subscriber circuit TS1 to a central system within the exchange A and, similarly, subscriber stations TN2 and TN3 are connected through their corresponding subscriber lines and associated subscriber circuits TS2 and TS3 to a central system within the exchange B. It will be understood that a plurality of such subscriber stations are incorporated with each of the exchanges A and B. Further, for the purpose of the following discussion, it shall be assumed that subscriber stations TN2 and TN3 are assigned jointly to several persons.

In FIG. 2 there is shown, partly in block diagram form and partly in schematic form, apparatus associated with the subscriber station TN2 of exchange B in FIG. 1. A brief discussion of the operation of the circuit system will facilitate an understanding of the use of information signals in providing auxiliary services in a telephone installation. The subscriber station TN2 is equipped with a special announcement or call system L which can respond to information signals transmitted by a calling subscriber during appropriate call signal pauses. For example, a subscriber associated with subscriber station TN1 in FIG. 1 may transmit information signals, subsequently to the establishment of a call connection between the subscriber stations TN1 and TN2, which identify the particular person at the called subscriber station TN2 to which the calling subscriber station TN1 wishes to speak.

The announcement system L of FIG. 2 may comprise a loudspeaker which is connected in series through contacts *hu* and *r* and capacitor C between the inlet terminals *a* and *b* which connect the subscriber station TN2 to the exchange B (FIG. 1). Capacitor C is further connected in series with one pair of diametrically opposed terminals of a bridge, or full-wave rectifier G1, G2, G3, and G4 between the terminals *a* and *b*. A relay R is connected between the other pair of diametrically opposed terminals of the bridge rectifier. The capacitor C may represent a suitable filter circuit rather than a single capacitor.

During establishment of the call connection, relay R is energized and opens its corresponding contact *r*, thereby preventing energization of the announcement system L. However, during pauses in the call connection dial pulses, and upon termination thereof, the relay R is not energized. As a result, the contact *r* of relay R, and the contact *hu*, which represents a contact of a hook-type switch are in the closed positions indicated. The announcement system L may thereby be energized by information signals applied across the terminals *a* and *b*. If the announcement system L comprises a loudspeaker, as indicated, the information signals transmitted by the calling subscriber and demanding an announcement type of special service at the called subscriber station TN2, may then energize the loud speaker L to identify the desired person at the called subscriber station TN2. The information signals transmitted to the loudspeaker L for this purpose may be audiofrequency signals which directly energize the exciting windings of the loudspeaker to produce the audible announcement.

The subscriber of the calling subscriber station TN1 may be provided an option as to employing the special service. Initially, the calling subscriber dials the calling number of the called subscriber station to establish the call connection desired. The system then provides a grace period, or delay period, following completion of dialing of the dial signals demanding the call connection to a specific calling number. During this grace period, the calling subscriber may additionally transmit one or more information signals for demanding the operation of the special apparatus, such as the loudspeaker L at subscriber station TN2. In this manner, the calling subscriber may request that a selected person at the called subscriber station TN2 respond to the call.

The transmission of dial signals for establishing the call connection is well known and not described in detail hereafter. For the transmission of the information signals, there is assigned to the subscriber of the calling subscriber station TN1, the apparatus D1. The apparatus D1 may comprise a relatively simple pushbutton set which may be actuated in accordance with a predetermined code for requesting the desired announcement by the special apparatus of the called subscribed station. Preferably, the operation of the pushbutton set D1 in producing the information signals utilizes the preexisting systems provided for the generation and transmission of the dial signals which demand the call connection.

For example, the subscriber station TN1 may provide for the transmission of dial signals by a pushbutton operation. In such systems, as is well known, the dial signals typically are transmitted in accordance with sound frequency codes generated by sound frequency generators in response to the actuation of the pushbuttons of the subscriber receiver set. In such a pushbutton or tone dial frequency system, the generation of the information signals may be effected suitably by utilizing the same sound frequency generators employed for the tone dial frequency signals, but as controlled by the data apparatus D1. By this technique, the information signals may be transmitted in a code which is readily distinquishable from the code of the dial signals, while only a minimum of additional apparatus is required at the calling subscriber station.

For the purpose of further describing the operation of the telephone installation of the invention, is shall be assumed that four persons are assigned to the subscriber station TN2. Further these four persons are identified by four corresponding, different information signals "S," "T," "U," and "V." If the subscriber of subscriber station TN1 wishes to speak to the person at subscriber station TN2 identified by the information signal "S," then after dialing the calling number of subscriber station TN2, i.e., after emitting the dial signals in a code corresponding to the calling number, for demanding the call connection to station TN2, the calling subscriber then emits the information signal "S." As noted previously, the transmission of the information signal "S" may be effected in a convenient manner through the operation of the set D1 in a tone frequency system, or in any other suitable manner in tone frequency or conventional digit dialing systems.

Referring more specifically to the system set forth in FIG. 1, the subscriber station TN1 is connected over its subscriber line and corresponding subscriber circuit TS1 to the subscriber dial selector TWA of exchange A. The exchange A further includes a relay set RSA connected to the selector TWA. In a conventional manner, a subscriber desiring to place a call, lifts the receiver of the subscriber set at station TN1 and is connected through the selector TWA to relay set RSA. Relay set RSA then transmits a dial tone to the calling subscriber at station TN1, whereupon the calling subscriber may initiate the dialing of dial signals for demanding a given call connection.

The dial signals are transmitted through exchange A and its connection coupler AKA to a register REG A. For purposes to be explained, the dial signal may also be transmitted to a central control system UMWA of the exchange A. The central control system UMWA responds to the dial signals to establish a connection from relay set RSA of exchange A to relay set RSC of exchange B, in accordance with the call connection demand represented and identified by the dial signals.

Relay set RSC is assigned to a connection line of exchange office B associated with the receipt of incoming calls and may provide a balancing network or other suitable compensation system, as required, Relay set RSC is connected through coupler AKC to register REG C, whereby the latter may receive incoming dial signals, for registration therein and for subsequent transmission to the central control system UMWC of exchange B. The central control system UMWC and/or the register REG C provide for recoding and converting of the dial signal in accordance with the requirements of exchange B. The central control system UMWC, in accordance with the registered dial signals, operates through coupler AKB to establish a connection between the relay sets RSC and RSB. There is further established over subscriber dial selector TWB a connection from the relay set RSB to the subscriber circuit TS2 of the called subscriber station TN2 of exchange B.

As a first example of the demanding of a special service, it will be assumed that the calling subscriber station TN1 has emitted, within the time period allowed, the information signal "S" which designates the desired person at the called subscriber station TN2 with which the calling subscriber of station TN1 wishes to speak. Generally, the exchange B responds to the information signal "S" to convey this information signal from the register REG C to the character station TN2.

In accordance with the invention, the transmission of the information signal requires that there first be derived from the information signal a dial signal for establishing required circuit connections. The central control system UMWC performs the information transformation for deriving the dial signal from the information signal. The dial signal thus derived establishes coupling connections through the relay set RSB, which ordinarily are not established in response to the transmitted dial signals, and which initially demanded the call connection. The transformation, however, does not necessarily change the information content of the information signals but rather provides for transmitting to the subscriber station TN2 appropriate signals for actuating the special call system or announcement system in accordance with that information content.

As a further example of the special services available in accordance with the invention, it shall be assumed that person T associated with the subscriber station TN2 is temporarily or even permanently no longer available at the subscriber station TN2. However, person T may be reached over subscriber station TN3 of exchange B. This circumstance is transmitted to the central control system UMWC through suitable information signal transmission and may be registered therein until further notice. The registration of the circumstance may be effected in any suitable manner through means (not shown) provided in the central control system UMWC.

If the calling subscriber TN1 of exchange A, subsequently to the emission of dial signals for demanding a call connection to station TN2, now transmits an information signal T, the system of the invention provides for calling the person T at his now available location at subscriber station TN3. For example, the person T of station TN2 may be available at a location identified by an information signal X and associated with subscriber station TN3. The central control system UMWC therefore transforms the information signal T to the information signal X and establishes a connection to the subscriber station TN3. During call pauses, the information signal X is transmitted to the station TN3, in place of the transmission of the originally transmitted information signal T to the station TN2, whereby the desired person is reached at his new location.

An additional special or auxiliary function may be effected for the circumstance that a subscriber is temporarily unavailable at his normally assigned subscriber station and in addition is not available at another subscriber station. For example, a subscriber identified by an information signal U and associated with station TN2 may be temporarily unavailable. Prior to such unavailability the subscriber U registers appropriate information indicating this circumstance in the central control system UMWC of exchange B.

The temporary unavailability condition may further be registered in an announcement apparatus AN connected in a manner similar to a conventional subscriber station, over a subscriber circuit TSAN to the subscriber selector TWB. Thus, in accordance with the registered information indicating the temporary unavailability of the subscriber U associated with station TN2 in response to receipt of an information signal U, the central control system UMWC may complete a circuit from the calling subscriber to the subscriber circuit TSAN of the announcing apparatus AN.

The announcing apparatus AN may provide any form of suitable response to the calling subscriber. For example, the response may comprise a general text, which may be recorded, and which serves for any desired number of calling subscribers of exchange B to announce the unavailability thereof. However, the announcing apparatus AN may also provide a special text intended for the exclusive use of a specific subscriber of any station of exchange B in response to attempts by other, calling subscribers to reach him. Further, a special text may be provided as a response to a specific calling subscriber, when the latter attempts to reach any or a specific one of the subscribers of exchange B.

For this purpose, suitable information is transmitted to and registered in the announcing apparatus AN for identifying the calling and called subscribers and the desired response text, in accordance with the conditions set forth above. For the given example, subscriber U of station TN2 may register, in the apparatus AN, information identifying himself by the signal U as a particular subscriber associated with the station TN2. Further, the subscriber U may ascribe to the general text, or may provide a specific text, relating to his unavailability and may designate a general or specific text as a response to attempted call connections from any or from specific calling subscribers.

A further special service may be provided whereby a subscriber may indicate to the central system that no calls are to be received for a certain period of time, but that information relating to attempted call connections be recorded. For example, a subscriber of station TN2 identified by information signal V may transmit the signal V to the central control system UMWC to identify himself, and appropriate information signals to indicate this circumstance. The central control system UMWC effects registration of this information such that, upon receipt of an information signal V from a calling subscriber indicating a desired connection to the thus identified, called subscriber, the central control system UMWC may effect a suitable information transformation as required by the registered information. More particularly, the transformation comprises the derivation of a dial signal which establishes a coupling connection through relay set RSB but without the normally resultant emission of call current to the subscriber station TN2. Instead, the connection through relay set RSB completes a connection to a data receiver D2 assigned to subscriber station TN2.

The central system UMWC, in effecting the information transformation of the information signal V, may simultaneously produce an information signal or signals for recordation in the data system D2 to identify the attempted call connection. Typically, the recordation includes the name of the subscriber and/or the corresponding identifying information signal such as the signal V in the current example. The central system UMwC, or the system D2 may transmit an information signal, which may comprise merely an audible sound, to the calling subscriber, such as the subscriber TN1 in the current example, to indicate that the calling subscriber TN1 may transmit a message for recordation. The calling subscriber TN1 is thereby instructed to transmit further information signals in accordance with predetermined code, representing a message which is thereafter to be presented to subscriber V of station TN2. This message then is suitably recorded, and the subscriber V may then refer to it when convenient.

The central systems UMWA and UMWC are each equipped with suitable circuit means and apparatus to provide the functions described above. For example, each may include suitable arrangements of relays, transistor circuits, ring cores, and other magnetic storage elements and the like, to effect the registration of data. As will be appreciated from the foregoing description, this data is necessary for the information transformation, wherein the information content itself must be transformed to enable the response of the auxiliary apparatus of the called subscriber circuits, and wherein only the form and not the content of the information is changed. Appropriate data is also registered to enable the simultaneous code conversion of information signals, which is required for call connections between exchanges having different code programs, whether auxiliary services requested are provided by similar or different special apparatus.

As described above, the data registered in the central systems and necessary for the information transformation is effected in part, through suitable transmissions from the particular subscriber stations associated with the central system to registration systems of the latter. The information thus registered also identifies the specific subscriber of a given station to which the transmitted and registered information pertains. By suitable and well-known means, the registered data may be cancelled when the circumstance which occasioned its registration has terminated.

By contrast, data of a more general nature which is required by a central system of a given exchange for effecting information transformation and for additional functions, such as code conversion and the like, may be registered permanently in central systems of an exchange office, or of an entire exchange office area. For example, such permanent registration of general data may be provided by permanently wired programs. The nature of such general data information will readily be appreciated by those skilled in the art. For example, such general data may comprise information relating to auxiliary apparatus capabilities of different exchange systems and to the code programs thereof.

As noted previously, each of the central control systems UMWA and UMWC of the exchanges A and B respectively may provide for a plurality of subscribers associated therewith and, in accordance with known techniques, may provide for local call connections between such subscribers. Where a calling subscriber demands a local call connection, only the central system of the exchange associated with the local call connection need participate in establishing the call connection and in any requisite information transformation. In this instance, since all systems associated with a given exchange typically operate under the same code program, code conversion is not required. However, transformation of information signals may be required due to different forms of special apparatus available at different subscriber stations within a single exchange, and due to the transformations required for certain special functions, as described above.

Call connections, such as long distance call connections, may be established which require the participation of several exchange offices and their corresponding central control systems. For this purpose, each central control system is connectable in the manner of the system UMWA with register REG A and relay set RSA for providing exciting or energizing current to a calling subscriber such as TN1, and the manner of the system UMWC with relay set RSC and register REG C for receiving and registering incoming dial and information signals and with couplers AKB and TWB and relay set RSB for the further transmission of transformed signals. The central systems in each participating exchange also provide for the registration of appropriate information for effecting necessary transformations. In addition, the central control systems of the participating exchanges may communicate directly with one another over central data connections, such as the connection *d* between the central control systems UMWA and UMWC of FIG. 1. Further, other circuits associated with participating exchanges, such as the relay sets RSA, and RSC, RSB of exchanges A and B, respectively, similarly may be connected together, as indicated by dotted lines in FIG. 1, for signal transmission.

In summary the telephone installation of the invention provides for increased efficiency and more complete utilization of the circuit capabilities of telephone exchange systems, particularly as relates to auxiliary and special services which may be provided thereby. The information transformation effected by the central systems of participating exchanges in call connections provides compatibility between such auxiliary systems, despite diverse or normally incompatible operating characteristics thereof. By providing such compatibility, the best possible service is assured to the subscribers. The capability of the central control systems, in accordance with the invention of providing for simultaneous information transformation and code conversion permits the development of these systems at a minimum cost while maintaining maximum efficiency and minimum operating costs.

It will be evident that many changes could be made in the systems of the invention without departure from the scope thereof. Accordingly, the invention is not to be considered limited to the particular embodiments disclosed herein but only by the scope of the appended claims. It is therefore intended by the appended claims to cover all such modifications and adaptations as fall within the true spirit and scope of the invention.

We claim:

1. A telephone installation for processing signals emitted by a calling subscriber including dial signals for establishing a call connection to a called subscriber station and subsequently emitted information signals for requesting auxiliary services related to the call connection, comprising:
   a central control system (UMWA or UMWC) including means for registering information auxiliary identifying operating characteristics and capabilities of calling and called subscriber stations and means for transforming the information content to change the meaning of any information signals emitted by a given calling subscriber station (TN1) and to be transmitted to a given called subscriber station (TN2) in accordance with the related information registered in said registration means.

2. A telephone installation as recited in claim 1 wherein:
   a given called subscriber station (TN2) is available to a plurality of persons selectively identifiable by corresponding information signals, and
   said central control system (UMWC) includes means for transforming information signals received from a calling subscriber (TN1) and identifying a selected person of the given called subscriber station (TN2) to dial signals for identifying the selected person to the called (TN2) subscriber station.

3. A telephone installation as recited in claim 2, wherein there is further provided:
   a further subscriber station (TN3) coupled to said central control system (UMWC),
   said called subscriber station includes means for registering in said registration means of said central control system (UMWC) the information that the selected persons of said called subscriber station (TN2) is currently available at a location of said further subscriber station (TN3), and
   said central control system is operable to transform the information signal (T) received from said calling subscriber (TN1) which identifies the selected person (T) of the called subscriber station (TN2), in response to the registered location information relating to the selected person, to produce a signal for completing a call connection to the selected person at the location of said further subscriber station.

4. A telephone installation as recited in claim 1, wherein there is further provided:

first auxiliary service means (D1) coupled to said calling subscriber station (TN1) for transmitting information signals.

5. A telephone installation as recited in claim 4, wherein there is further provided:

second auxiliary services means (D2, TSAN, AN) coupled to said called subscriber station (TN2), said registration means of said central control system is operable to register information identifying the characteristics and capabilities of said second auxiliary means, and said central control system is operable in response to the information registered in said registration means thereof relating to said second auxiliary service means to transform information signals received from said calling subscriber station to provide a response thereto at said second auxiliary service means.

6. A telephone installation as recited in claim 1, wherein there is further provided:

first exchange (A) including a first central control system (UMWA) and a first plurality of subscriber stations, a second exchange (B) including a second central control system (UMWC) and a second plurality of subscriber stations, and each of said first and second central control systems is operable to simultaneously effect code conversion and information transformation of signals received by a calling subscriber.

7. A telephone installation as recited in claim 1 wherein:

there is further provided connection means controlled by said central control system in response to dial signals received from a calling subscriber to establish a call connection to a called subscriber, and said central control system includes means for registering dial signals received from a given calling subscriber and operable to delay the completion of a call connection demanded by the registered dial signals for a predetermined time period to permit the subsequent receipt of any information signals emitted by the given calling subscriber for requesting auxiliary services related to the demanded call connection.